United States Patent
Koch et al.

[11] Patent Number: 6,047,472
[45] Date of Patent: Apr. 11, 2000

[54] METHOD AND APPARATUS FOR INSTALLING A COMPONENT GROUP, COMPRISING A PISTON AND A CONNECTING ROD, IN AN INTERNAL COMBUSTION ENGINE

[75] Inventors: Martin Koch, Haan; Carsten Kunert, Monheim; Alexander Selaru, Mühlheim, all of Germany

[73] Assignee: ABB Patent GmbH, Mannheim, Germany

[21] Appl. No.: 09/055,801

[22] Filed: Apr. 6, 1998

[30] Foreign Application Priority Data

Apr. 4, 1997 [DE] Germany ............... 197 13 996

[51] Int. Cl.[7] ................................................. B23Q 17/00
[52] U.S. Cl. ........................................ 29/888.01; 29/888
[58] Field of Search ............................ 29/888.01, 428, 29/888

[56] References Cited

U.S. PATENT DOCUMENTS 4,843,697  7/1989  Marshall ..................... 29/888.01
4,843,708  7/1989  Yokoi et al. ................. 29/888.01

FOREIGN PATENT DOCUMENTS 2554784  6/1977  Germany .

*Primary Examiner*—Irene Cuda
*Attorney, Agent, or Firm*—Herbert L. Lerner; Laurence A. Greenberg; Werner H. Stemer

[57] ABSTRACT

The process and apparatus avoid incorrect assembly and added expense caused by prior art alternating manual and equipment-reinforced assembly operations. Full automation is attained in that the component group is picked up by a robot and transferred to a press-fitting unit. Once the crankcase and the crankshaft, with the aid of rotary and adjusting devices, have been rotated into an assembly position for the piston and the connecting rod, the component group is introduced into a cylinder opening until the connecting rod contacts the crankshaft. The robot then picks up a connecting rod cap that has already been equipped with screws and screws it together with the connecting rod.

4 Claims, 6 Drawing Sheets

METHOD AND APPARATUS FOR INSTALLING A COMPONENT GROUP, COMPRISING A PISTON AND A CONNECTING ROD, IN AN INTERNAL COMBUSTION ENGINE

BACKGROUND OF THE INVENTION

1. Field of the Invention

The invention relates to a method for installing a component group, comprising a piston and connecting rod, in a crankcase of an internal combustion engine. The crankcase is brought to the mounting position on a belt-type transport system. The component group is introduced into a cylinder opening with the interposition of a perforated plate. Finally, a connecting rod cap is screwed to a bearing half of the connecting rod.

In the prior art methods, manual and equipment-supported semi-automatic and automatic assembly operations alternate with one another. Thus in a first step, the component group is introduced into the cylinder opening, using a perforated plate. The piston and connecting rod are manually selected and aligned. In a further step, the connecting rod and connecting rod cap are manually joined to the crankshaft and prescrewed. The component is finally screwed in a special, separate screwing station. Because of the combination of manual and equipment-reinforced assembly operations at various positions along the crankshaft, the risk of incorrect assembly is great, requiring expensive quality control checking operations. The complexity of the sequence increases still further for the assembly of V-type engines, because there the number of possible crankcase and crankshaft positions is substantially greater than with in-line engines.

SUMMARY OF THE INVENTION

It is accordingly an object of the invention to provide a method and an apparatus for installing a component group, which comprises a piston and a connecting rod, in an internal combustion engine, which overcomes the above-mentioned disadvantages of the prior art devices and methods of this general type and which creates full automation of assembly while minimizing the effort and expense.

With the foregoing and other objects in view there is provided, in accordance with the invention, a method of installing a component group in a crankcase of an internal combustion engine, the component group including a piston and a connecting rod, the method which comprises:

lifting and transferring a crankcase to a rotary unit;

picking up a component group comprising a piston and a connecting rod with a gripper of a robot and transferring the component group to a press-fitting unit;

rotating the crankcase about an axis of a crankshaft thereof until a mounting position for the piston is reached;

rotating the crankshaft with an adjusting device until a mounting position for the connecting rod is reached;

aligning a perforated plate and the press-fitting unit with a cylinder opening into which the component group is to be inserted;

introducing the component group into the cylinder opening with the connecting rod leading until a bearing half thereof contacts the crankshaft; and with the robot, picking up a connecting rod cap equipped with screws, joining the connecting rod cap to the connecting rod, and screwing the connecting rod cap and the connecting rod together.

By the cooperation of the various stations with at least one robot, the assembly process is error free. Quality control and checking operations can be reduced to a minimum. Moreover, the simplicity and thus the ease of maintenance is increased by the use of robots.

In accordance with an added feature of the invention, the component group is picked up with a first robot, and the connecting rod cap is picked up, joined and screwed with a second robot.

In accordance with an additional feature of the invention, the component group is retained in a fixed position during the joining and screwing steps.

In accordance with another feature of the invention, the method includes the steps of simultaneously picking up the component group and the connecting rod cap with the first robot; transferring the component group to a clamping element of the press-fitting unit, and subsequently transferring the connecting rod cap to the second robot; and causing the first robot to put a piston brace into position and retaining the position of the piston brace during the joining and screwing operation.

With the above and other objects in view there is also provided, in accordance with the invention, an apparatus for performing the above-outlined method. The apparatus comprises:

a belt-type transport system for transporting a crankcase into a predetermined mounting position;

an assembly machine having a cross section embracing the transport system in a U and leaving a free space for the crankcase;

the assembly machine having a frame carrying, opposite one another alongside the transport system, a rotary unit and an adjusting device, and the frame having a crossbar receives a perforated plate and a press-fitting unit;

a workpiece carrier lift carrying the crankcase; and at least one robot operatively associated with the assembly machine and reaching into a working range of the assembly machine, the at least one robot including a gripper having a screwing unit integrated therein.

In other words, the assembly machine fits over the transport system, leaving a free space for the crankcase. The assembly machine, which has a frame, carries the rotary unit for the crankcase and the adjusting device for the crankshaft opposite one another along the long sides of the transport system. The perforated plate and the press-fitting unit are disposed on a crossbar of the frame. At least one robot, which reaches into the working range of the assembly machine, is assigned to the compact assembly machine.

In accordance with again another feature of the invention, the rotary unit includes a clamping head for receiving the crankcase; the adjusting device being equipped with a clamping element for making a connection with the crankshaft; and wherein, after the crankcase has been received by the rotary unit, a rotary unit axis, a crankshaft axis, and an adjusting device axis are aligned along a straight like.

In accordance with a concomitant feature of the invention, the rotary unit, the adjusting device, the perforated plate, and the press-fitting unit are adapted to assuming a plurality of positions relative to the crankcase.

Other features which are considered as characteristic for the invention are set forth in the appended claims.

Although the invention is illustrated and described herein as embodied in a method and apparatus for installing a component group, comprising a piston and a connecting rod, of an internal combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
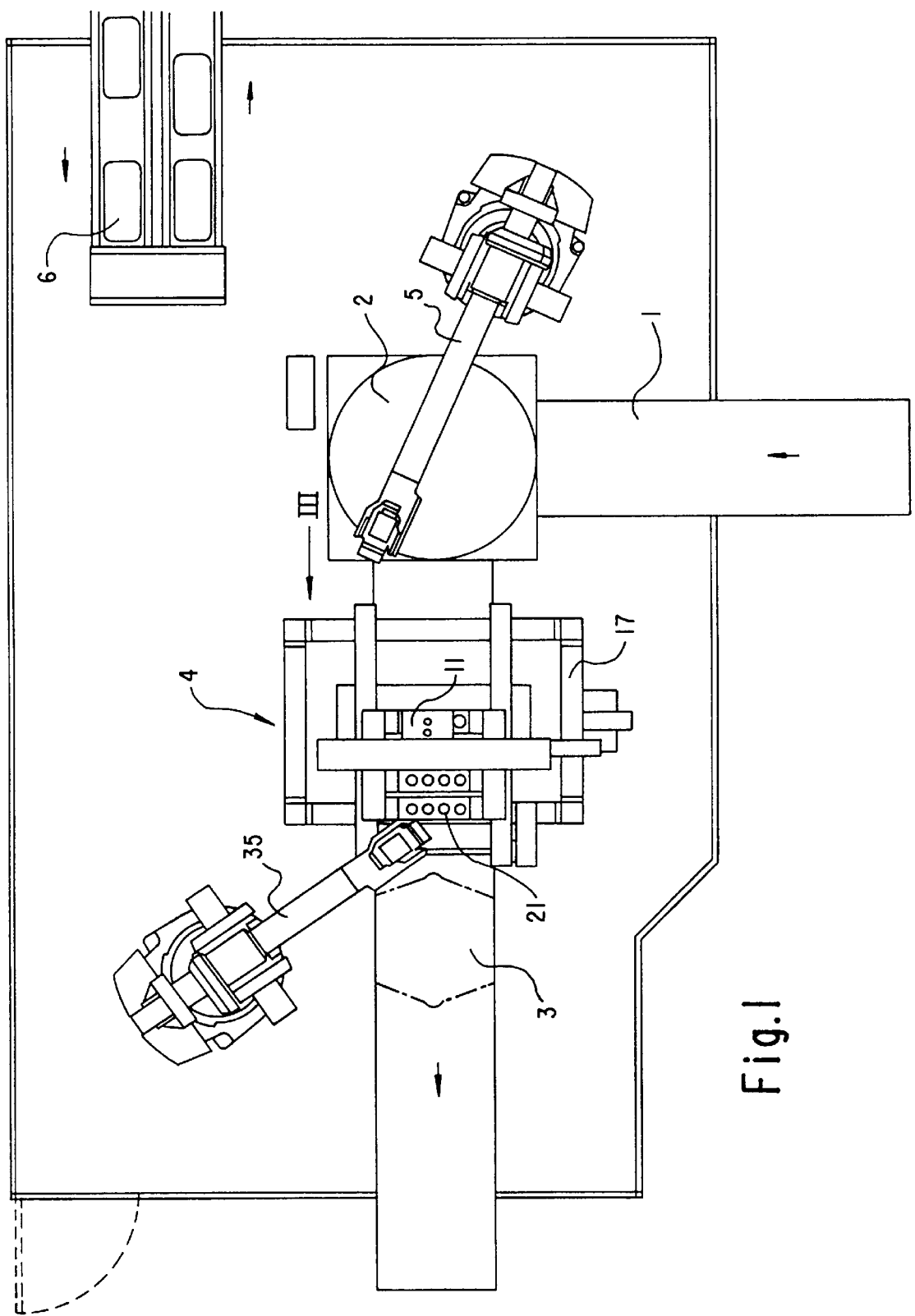
FIG. 1 is a plan view of the novel assembly system.
Figure 2:
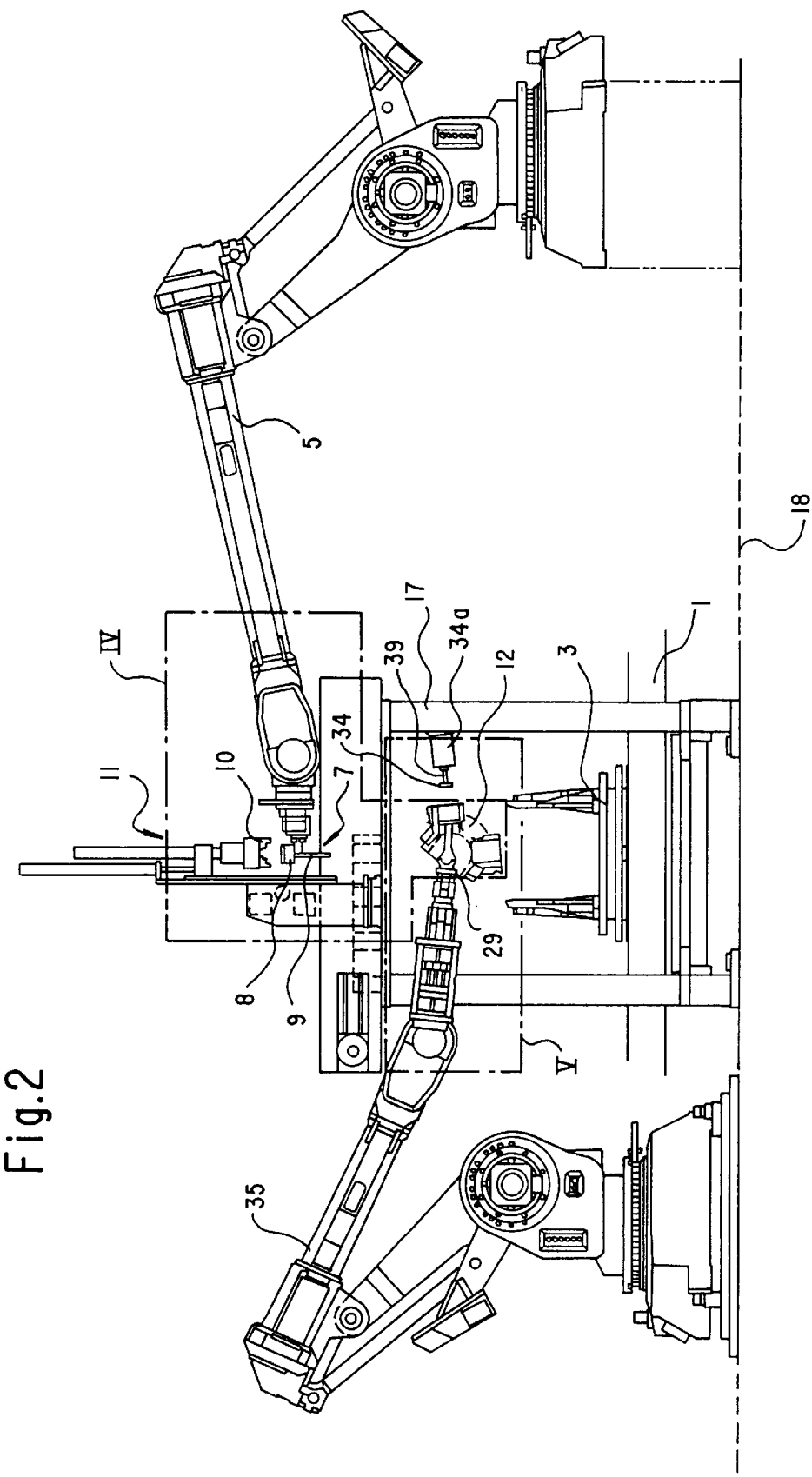
FIG. 2 is a side elevational view of the system of FIG. 1 with the robot grippers in the working position.
Figure 4:
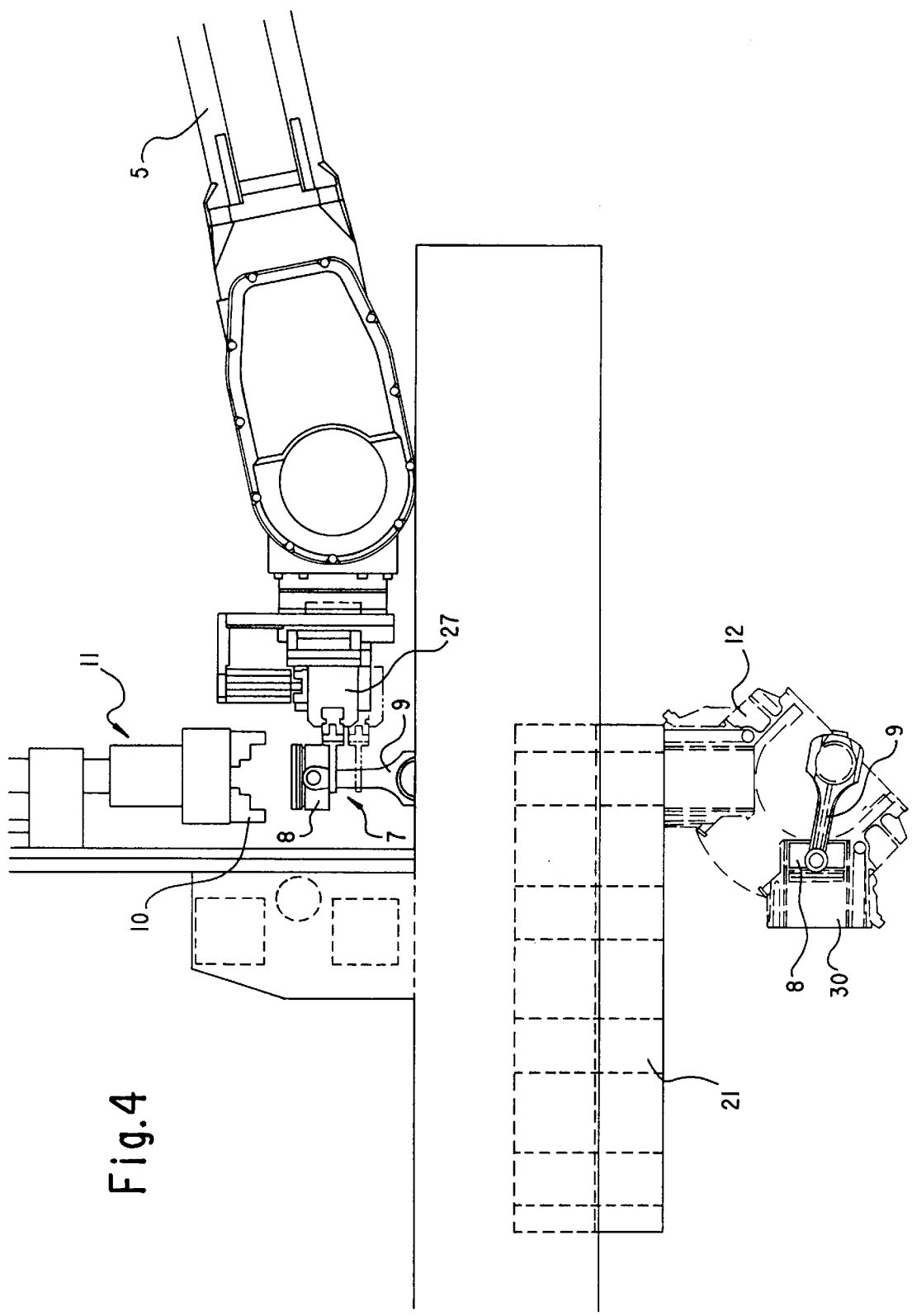
FIG. 4 is a side view of a detail IV of FIG. 2, on a larger scale and with the crankcase in a different position.
Figure 5:
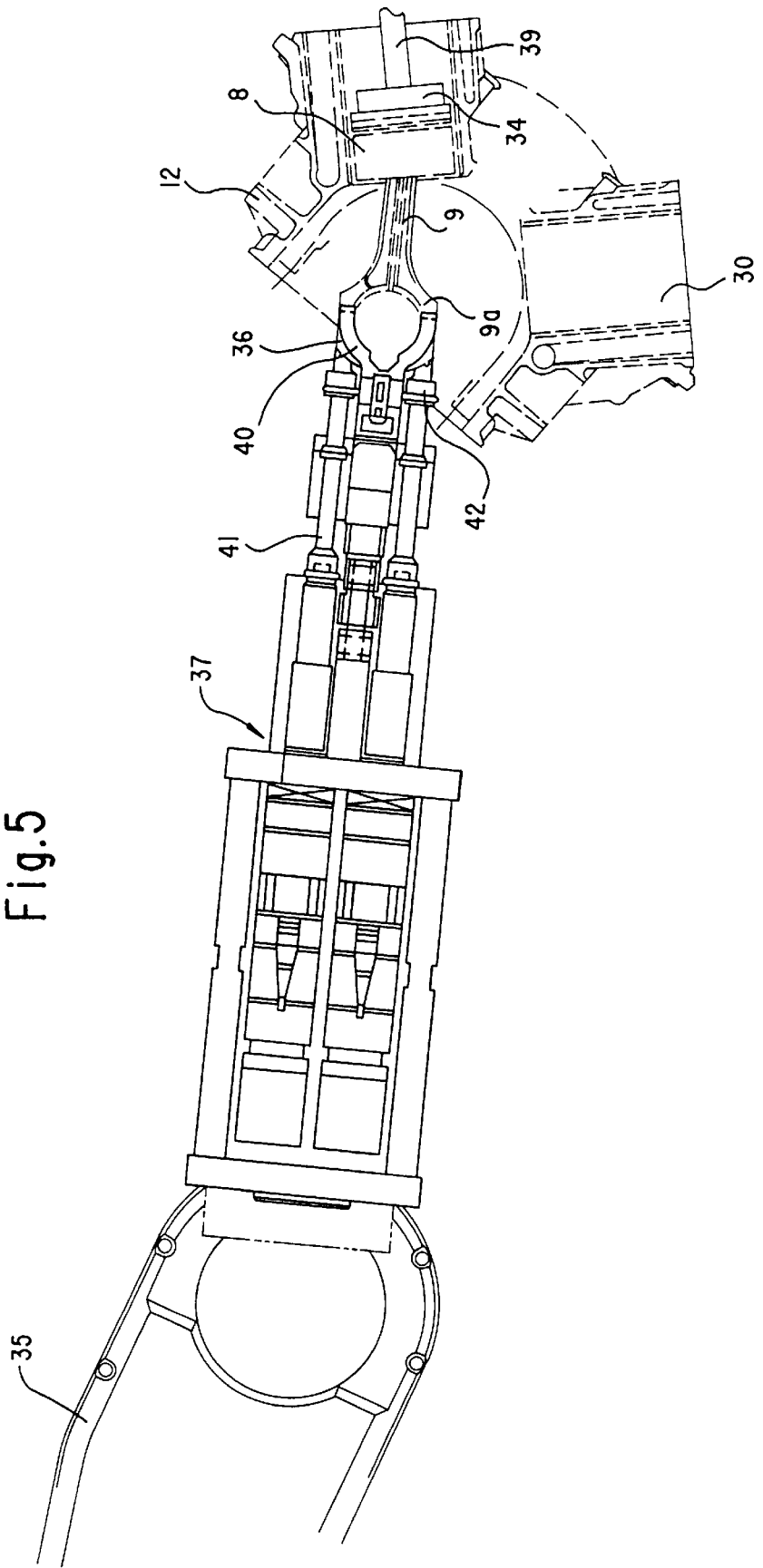
FIG. 5 is a view of a detail V of FIG. 2.

Referring now to the figures of the drawing in detail and first, particularly, to FIG. 1 thereof, there is seen, in a top plan, an configuration of the novel assembly system. Along a belt-type transport system 1 with a deflection station 2, a workpiece carrier 3 with a non-illustrated crankcase enters the range of an assembly machine 4. As can be seen in conjunction with FIGS. 2 and 4, a robot 5 picks up a component group 7, which comprises a piston 8 and a connecting rod 9, from a pallet 6 brought on a conveyor belt. The component group is transferred to a clamping element 10 of a press-fitting unit 11. The clamping element 10 is embodied such that in the clamping operation, all the piston rings centrally enter their piston ring groove on the piston. With this form-locking bracing of the piston rings, it is assured that the pre-centering attained by the clamping element makes it easier to introduce the piston into the appropriate bore of the perforated plate. Without such pre-centering, the automated introduction operation cannot be replicated reliably, since an eccentric arrangement of the piston rings makes it difficult or impossible to introduce the piston.

Figure 3:
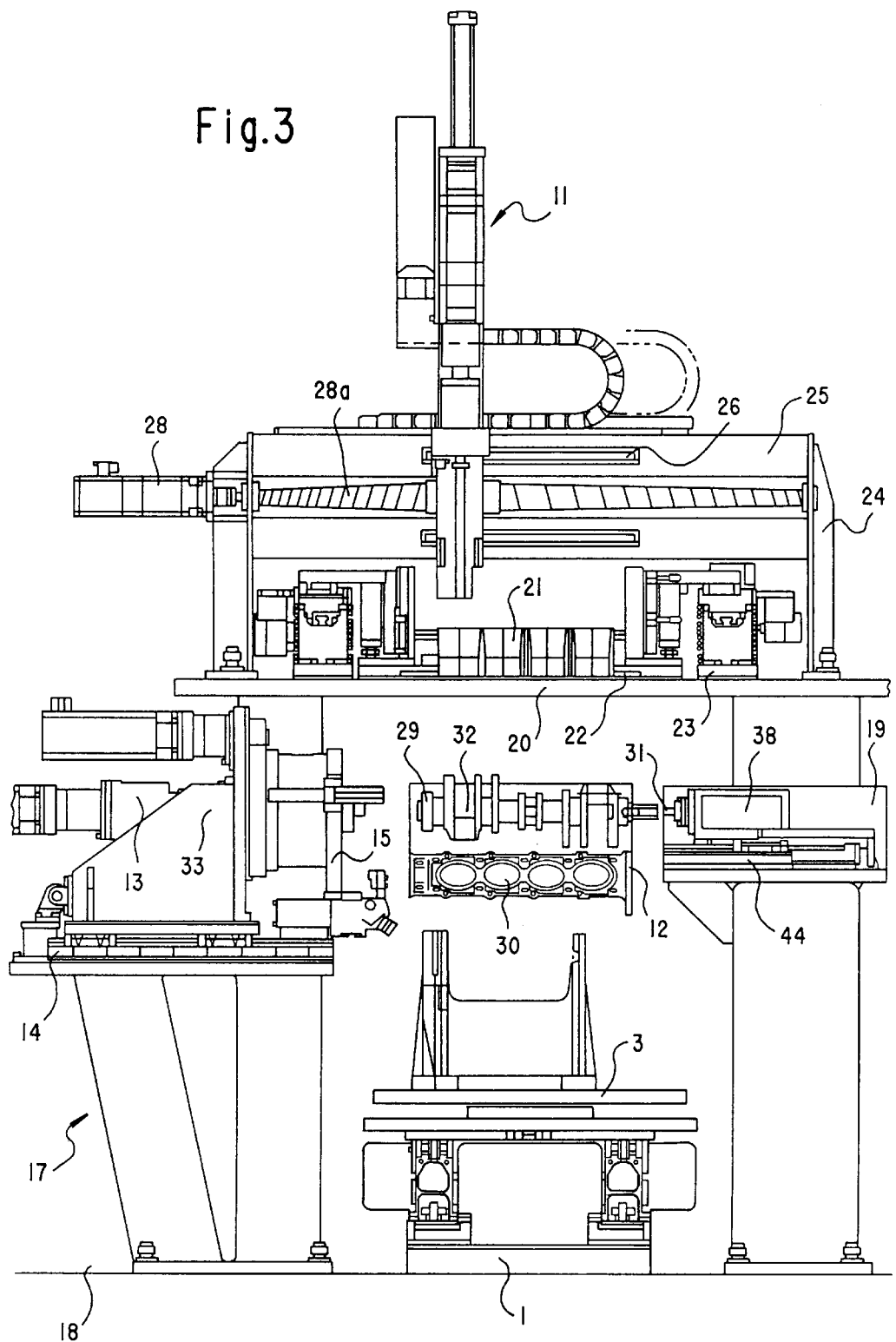
FIG. 3 is a side view in the direction of arrow III in FIG. 1, on a larger scale and omitting the robots.

The crankcase 12 has been picked up by the workpiece carrier 3 from a non-illustrated lift and assumes the position shown in FIG. 3. A rotary unit 13 is moved horizontally along guide rails 14 until its clamping head 15 contacts the crankcase 12. Once the clamping head has entered the clamping position, the rotary unit carries the crankcase, and the lift is moved downward to its initial position. The rotary device rests on a frame 17, which like the transport system 1 is supported on the floor 18 and in general fits in a U around the belt-type transport system. Opposite the rotary unit, the frame 17 carries an adjusting device 19, which is displaceable along guides 44. A crossbar 20 of the frame 17 receives a perforated plate 21, which is brought into a desired position along rails 22 with the aid of a drive mechanism 23. Bores of various diameters may be made in the perforated plate, so that with a single perforated plate, various types of engines can be equipped with pistons. The crossbar 20 has supports 24, which are connected to one another via transverse struts 25 that extend parallel to one another. The press-fitting unit 11 for introducing the piston 8 of the respective component group 7 is supported in guide elements 26 of the transverse struts 25 and is movable, for positioning of the press-fitting unit, along the guide elements 26 with the aid of a drive motor 28 via a spindle 28a.

The rotary device swivels the crankcase about the axis 32 of its crankshaft 29 until an assembly position for the piston 8 of the component group 7 has been attained. In this position (FIG. 4), the end face with the cylinder openings 30 comes to rest just below the perforated plate 21. Once the crankshaft 29, with the aid of the clamping element 31 of the adjusting device 19, has been rotated until reaching the appropriate assembly position for the connecting rod 9, a gripper 27 of the robot 5 transfers the component group to the clamping element 10 of the press-fitting unit 11. Once the crankcase 22 has been received by the clamping head 15 of the rotary unit 13, the axis 33 of the rotary unit 13, the axis 32 of the crankshaft 29 and the axis 38 of the adjusting device 19 form a straight line. This disposition of axes is maintained in every position of the crankshaft and crankcase. This makes it possible to execute the rotary and adjusting motions of the rotary unit and adjusting device either in succession or simultaneously. The clamping element 10 grips the piston 8 in such a way that the component group 7 can be introduced through the perforated plate 21 into the cylinder opening 30 with the freely suspended connecting rod 9 leading the way. Once the bearing half 9a belonging to the connecting rod has contacted the crankshaft, a piston brace 34 retains the piston in that position. The piston brace 34 is secured by its housing 34a to the frame 17. Once the crankcase 12 has been rotated into the position for assembling the connecting rod cap, the piston brace is made to contact the face end, toward it, of the piston 8, with the aid of a tappet 39. To simplify and speed up the assembly process, the piston brace may also be held and guided by a robot gripper. A further robot 35 joins a connecting rod cap 36 with regard to the connecting rod, and with the aid of a screwing unit 37 integrated into the gripper of this robot 35, the connecting rod cap is screwed to the connecting rod, thereby making the connection between the connecting rod and the crankshaft. To that end, the robot arm has a gripper 40 for grasping the connecting rod cap 36, the gripper being adapted to the shape of the connecting rod cap. The screw spindles 41 of the screwing unit extend outside the gripper and turn the screws 42 for fastening the connecting rod cap 36 into the connecting rod 9. During the screwing operation, the gripper 40 remains in its clamping position. Once the screwing has been completed, the piston brace 34 is retracted with the tappet 39; the screw spindles are moved inward, and the gripper 40 is disconnected from the connecting rod cap 36.

Figure 6:
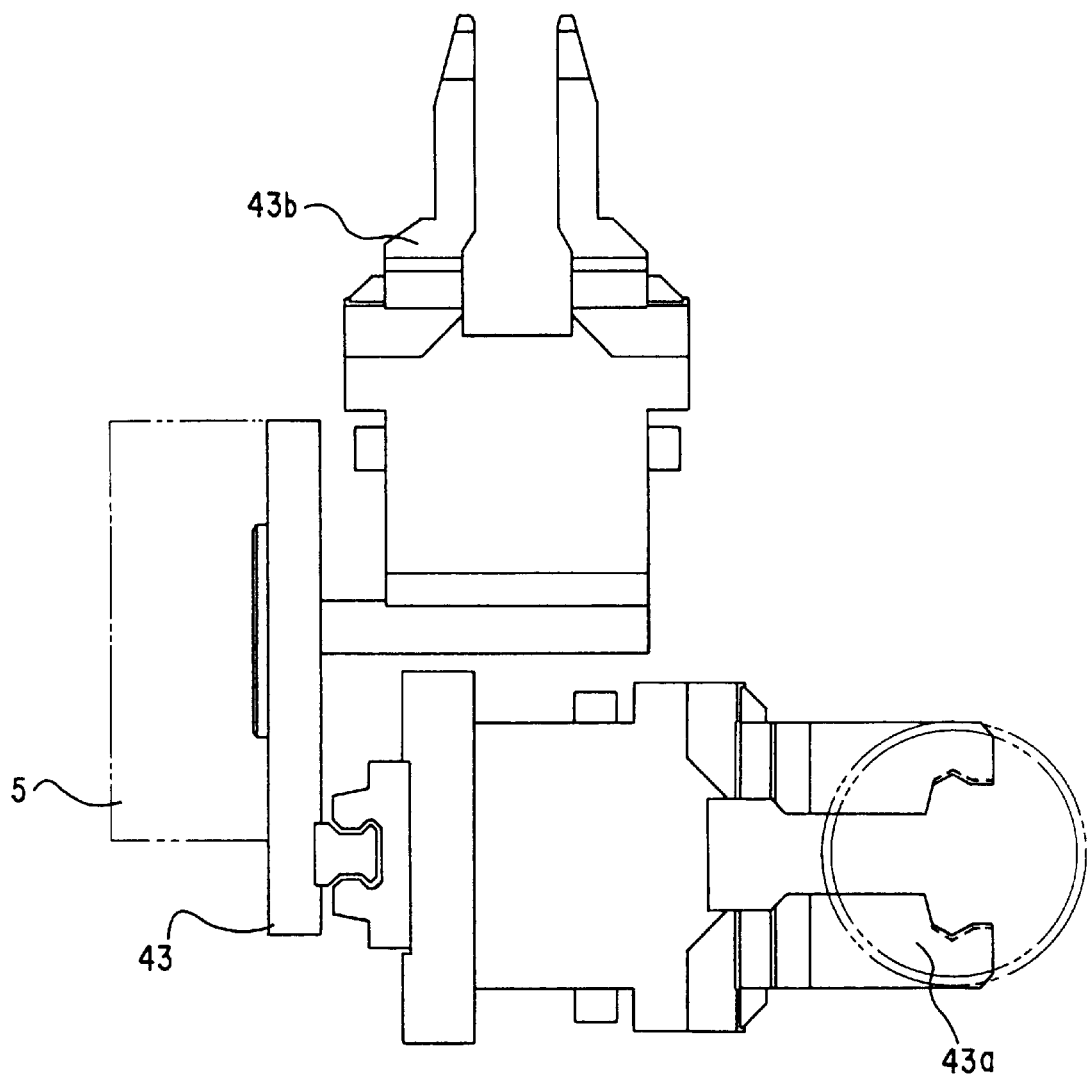
FIG. 6 is a schematic view of a double gripper for a robot of the embodiment of FIG. 4.

With reference to FIG. 6, a double gripper 43 is associated with the arm of the robot 5. This double gripper is capable of receiving both the component group 7 and the connecting rod cap 36, already equipped with the screws 42, from the pallet 6 simultaneously. During the swiveling motion of the robot 5, the connecting rod cap is transferred from a gripper 43a to the gripper device of the further robot 35. The other gripper 43b of the double gripper transfers the component group 7 to the clamping element 10 of the press-fitting unit 11.

We claim:

1. A method of installing components in a crankcase of an internal combustion engine, which comprises:

lifting and transferring a crankcase to a rotary unit;

picking up a component group comprising a piston and a connecting rod with a gripper of a robot and transferring the component group to a press-fitting unit;

rotating the crankcase about an axis of a crankshaft thereof until a mounting position for the piston is reached;

rotating the crankshaft with an adjusting device until a mounting position for the connecting rod is reached;

aligning a perforated plate and the press-fitting unit with a cylinder opening into which the component group is to be inserted;

introducing the component group into the cylinder opening with the connecting rod leading until a bearing half thereof contacts the crankshaft; and with the robot, picking up a connecting rod cap equipped with screws, joining the connecting rod cap to the connecting rod, and screwing the connecting rod cap and the connecting rod together.

2. The method according to claim 1, which comprises performing step of picking up the component group with a first robot, and performing the steps of picking up the connecting rod cap, joining and screwing with a second robot.

3. The method according to claim 1, which comprises retaining the component group in a fixed position during the joining and screwing steps.

4. The method according to claim 2, which comprises simultaneously picking up the component group and the connecting rod cap with the first robot; transferring the component group to a clamping element of the press-fitting unit, and subsequently transferring the connecting rod cap to the second robot; and causing the first robot to put a piston brace into position and retaining the position of the piston brace during the joining and screwing operation.

* * * * *